United States Patent
Kreinin et al.

(10) Patent No.: US 8,892,853 B2
(45) Date of Patent: Nov. 18, 2014

(54) HARDWARE TO SUPPORT LOOPING CODE IN AN IMAGE PROCESSING SYSTEM

(75) Inventors: Yosef Kreinin, Jerusalem (IL); Gil Dogon, Jerusalem (IL); Emmanuel Sixsou, Jerusalem (IL); Yosi Arbeli, Jerusalem (IL); Mois Navon, Efrat (IL); Roman Sajman, Givat Zeev (IL)

(73) Assignee: Mobileye Technologies Limited, Nicosia (CY)

( * ) Notice: Subject to any disclaimer, the term of this patent is extended or adjusted under 35 U.S.C. 154(b) by 813 days.

(21) Appl. No.: 12/797,689

(22) Filed: Jun. 10, 2010

(65) Prior Publication Data
US 2011/0307684 A1 Dec. 15, 2011

(51) Int. Cl.
*G06F 9/34* (2006.01)
*G06F 9/38* (2006.01)
*G06K 9/00* (2006.01)
*G06F 9/355* (2006.01)
*G06T 1/20* (2006.01)
*G06F 9/30* (2006.01)

(52) U.S. Cl.
CPC ............ *G06F 9/3853* (2013.01); *G06F 9/3889* (2013.01); *G06K 9/00986* (2013.01); *G06F 9/3555* (2013.01); *G06T 1/20* (2013.01); *G06K 9/00791* (2013.01); *G06F 9/30043* (2013.01)
USPC .............................................. 712/241; 712/7

(58) Field of Classification Search
USPC ..................................... 712/6, 7, 241; 711/214
See application file for complete search history.

(56) References Cited

U.S. PATENT DOCUMENTS 5,329,318 A * 7/1994 Keith ............................. 348/699
5,442,402 A * 8/1995 Sohn et al. .................. 348/416.1
5,524,265 A   6/1996 Balmer et al.
5,645,066 A * 7/1997 Gandini et al. ............... 600/443
5,724,608 A * 3/1998 Tohara ............................. 710/7

(Continued)

FOREIGN PATENT DOCUMENTS

NL        WO03100600 A2    12/2003
NL        WO2008050256 A1   5/2008

OTHER PUBLICATIONS

Extended European search report, Application No. 10165686.6-2218, Dec. 13, 2010.

(Continued)

*Primary Examiner* — Aimee Li
(74) *Attorney, Agent, or Firm* — The Law Office of Michael E. Kondoudis (57) ABSTRACT

An image processing system including a vector processor and a memory adapted for attaching to the vector processor. The memory is adapted to store multiple image frames. The vector processor includes an address generator operatively attached to the memory to access the memory. The address generator is adapted for calculating addresses of the memory over the multiple image frames. The addresses may be calculated over the image frames based upon an image parameter. The image parameter may specify which of the image frames are processed simultaneously. A scalar processor may be attached to the vector processor. The scalar processor provides the image parameter(s) to the address generator for address calculation over the multiple image frames. An input register may be attached to the vector processor. The input register may be adapted to receive a very long instruction word (VLIW) instruction. The VLIW instruction may be configured to transfer only: (i) parameters for image processing calculations over the image frames by the ALU units and (ii) a single bit to the address generator.

20 Claims, 7 Drawing Sheets

(56) References Cited

U.S. PATENT DOCUMENTS

| | | | |
|---|---|---|---|
| 6,453,405 | B1 | 9/2002 | Hoyle et al. |
| 6,459,813 | B1* | 10/2002 | Boon ............................ 382/238 |
| 7,003,163 | B2* | 2/2006 | Kondo .......................... 382/224 |
| 7,088,872 | B1 | 8/2006 | Hsieh et al. |
| 7,509,634 | B2* | 3/2009 | Kyo .............................. 717/161 |
| 7,760,912 | B2* | 7/2010 | Dana et al. ................... 382/108 |
| 7,796,166 | B2* | 9/2010 | Silverbrook ............... 348/231.6 |
| 8,139,850 | B2* | 3/2012 | Maxwell et al. ............. 382/164 |
| 2003/0188125 | A1 | 10/2003 | Segelken et al. |
| 2009/0161950 | A1* | 6/2009 | Dana et al. ................... 382/165 |
| 2009/0295928 | A1* | 12/2009 | Silverbrook ............... 348/207.2 |
| 2010/0142846 | A1* | 6/2010 | Tolliver et al. ............... 382/274 |

OTHER PUBLICATIONS

IEICE Trans. Fundamentals. vol. E92-A, No. 4 Apr. 2009, Ittetsu Taniguchi, "Reconfigurable AGU: An Address Generation Unit Based on Address Calculation Pattern for Low Energy and High Performance Embedded Processors", pp. 1161-1173.

"A Loop Accelerator for Low Power Embedded VLIW Processors", Binu Mathew, In Proc. of the 2004 International Conference on on Hardware/Software Co-design and System Synthesis, pp. 6-11, 2004.

Witness Statement for European Patent Application No. 10165686.6 Mobileye Technologies Ltd, Yosef Kreinin, Jun. 12, 2012.

\* cited by examiner

HARDWARE TO SUPPORT LOOPING CODE IN AN IMAGE PROCESSING SYSTEM

BACKGROUND

1. Technical Field

The present invention relates to an image processing system and specifically to an address generator used to calculate addresses so that multiple image frames or windows are processed in parallel.

2. Description of Related Art

Figure 1:
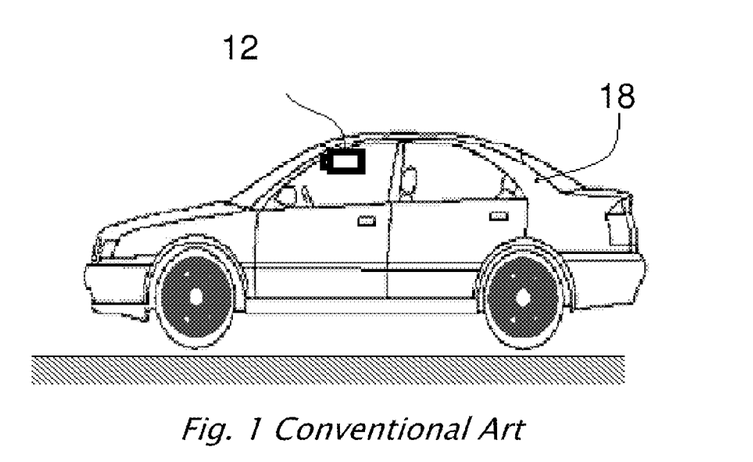
FIG. 1 shows a camera mounted on a vehicle according to conventional art.
Figure 2:
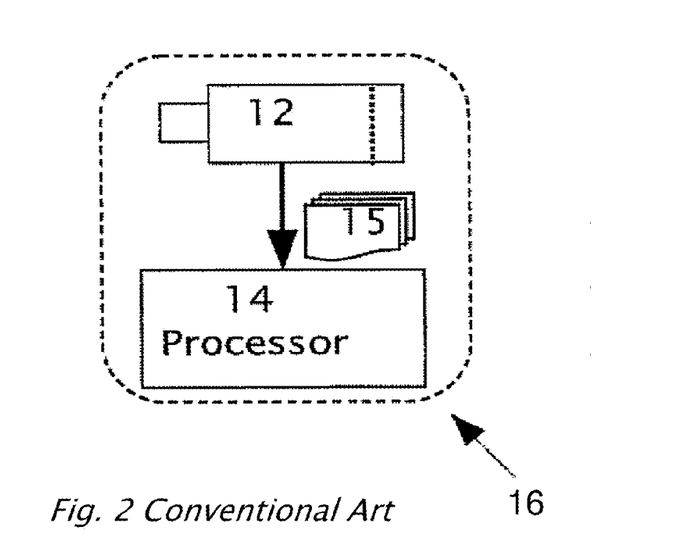
FIG. 2 shows a vehicle control system according to conventional art.

Reference is made to FIG. 1 (conventional art) and FIG. 2 (conventional art) which illustrate a system 16 including a camera or image sensor 12 mounted in a vehicle 18 imaging a field of view in the forward or rear direction. Image sensor 12 typically delivers images in real time and the images are captured in a time series of image frames 15. An image processor 14 is used to process image frames 15 for processing by one or more driver assistance systems.

Driver assistance systems include forward collision warning systems, lane departure warning systems, traffic sign recognition (TSR) and headlight control systems.

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation. There are various LDW systems available. One algorithm for lane departure warning (LDW) used by the assignee/applicant (Mobileye Technologies Ltd., Nicosia, Cyprus, hereinafter "Mobileye") of the present application is predictive in that it computes time to lane crossing (TLC) based on change in wheel-to-lane distance and warns when the time-to-lane crossing (TLC) is below a certain threshold. Other algorithms give a warning if the wheel is inside a certain zone around the lane marker. In either case, essential to the lane departure warning system is the lane marker detection algorithm. Typically, the lane markers are detected in the camera image and then, given the known camera geometry and camera location relative to the vehicle, the position of the vehicle relative to the lane is computed. The lane markers detected in the camera image are then collected over time, for instance using a Kalman filter. Wheel-to-lane marker distance may be given with an accuracy of better than 5 centimeters. With a forward looking camera, wheel-to-lane marker distance is not observed directly but is extrapolated from the forward view of the camera. The closer road markings are observed, less extrapolation is required for determining wheel-to-lane marker distance and more accurate estimates of wheel-to-lane marker distance are achieved especially on curves of the road. Due to the car hood and the location of the camera, the road is seldom visible closer than six meters in front of the wheels of the car. In some cars with longer hoods, the road visible in front of the wheels of the car is even less. Typically the lane departure warning system of Mobileye works on sharp curves (with radius down to 125 m). With a horizontal field of view (FOV) of 39 degrees of the camera, the inner lane markers are still visible on curves with a radius down to 125 meters. In order to correctly perform lane assignment on curves, lane markings are detected at 50 meters and beyond. With a horizontal field of view (FOV) of 39 degrees for the camera, a lane mark of width 0.1 meters at 50 m distance corresponds in the image plane to just under two pixels wide and can be detected accurately. The expectation from the lane departure warning systems is greater than 99% availability when lane markings are visible. Expectation with 99% availability is particularly challenging to achieve in low light conditions when the lane markings are not freshly painted (have low contrast with the road) and the only light source is the car halogen headlights. In low light conditions, the lane markings are only visible using the higher sensitivity of the clear pixels (i.e. using a monochrome sensor or a red/clear sensor). With the more powerful xenon high intensity discharge (HID) headlights it is possible to use a standard red green blue (RGB) sensor in most low light conditions.

The core technology behind forward collision warning (FCW) systems and headway distance monitoring is vehicle detection. Assume that reliable detection of vehicles in a single image a typical forward collision warning (FCW) system requires that a vehicle image be 13 pixels wide, then for a car of width 1.6 m, a typical camera gives initial detection at 115 m and multi-frame approval at 100 m. A narrower horizontal field of view (FOV) for the camera gives a greater detection range however; the narrower horizontal field of view (FOV) will reduce the ability to detect passing and cutting-in vehicles. A horizontal field of view (FOV) of around 40 degrees was found by Mobileye to be almost optimal (in road tests conducted with a camera) given the image sensor resolution and dimensions. A key component of a typical forward collision warning (FCW) algorithm is the estimation of distance from a single camera and the estimation of scale change from the time-to-contact/collision (TTC) as disclosed for example in U.S. Pat. No. 7,113,867.

Traffic sign recognition (TSR) modules are designed typically to detect speed limit signs and end-of-speed limit signs on highways, country roads and urban settings. In addition, iconic supplemental signs (e.g. rain, on exit (arrow), trailer) are typically detected and identified. Partially occluded, slightly twisted and rotated traffic signs are preferably detected. Systems implementing traffic sign recognition (TSR) may or should ignore the following signs: signs on truck/buses, exit road numbers, minimum speed signs, and embedded signs. A traffic sign recognition (TSR) module which focuses on speed limit signs does not have a specific detection range requirement because speed limit signs only need to be detected before they leave the image. An example of a difficult traffic sign to detect a 0.8 meter diameter traffic sign on the side of the road when the vehicle is driving in the center lane of a three lane highway. Further details of a TSR system is disclosed by the present assignee in patent application Ser. No. 11/951,405.

A typical automatic headlight or high/low beam control (AHC) system detects the following conditions and switches to from high beams to low beams: headlights of oncoming vehicles, taillights of preceding vehicles, street lights or ambient light indicating that high beams are not required and a low vehicle speed. The host vehicle lights are switched back to high beams when none of these conditions exist (often after a specified grace period). One approach for detecting taillights is to compare images from two sensors: one with a red filter and the second with a cyan filter. The cyan filter responds to non-red light sources and will give zero response to red light. By comparing corresponding pixels from two imaging sensors one can detect the color of the light source. The number of pixels of each color above a certain intensity is counted and if the count is above a threshold the systems switches to low beams. The use of color filters with imaging sensors may preclude the simultaneous use of the same image frames for other driver assistance applications.

A second approach for automatic high-beam control (AHC) uses an RGB sensor to give better color differentiation. Typical light sources can be located in the full CIE color space as defined by the International Commission on Illumination. This approach distinguishes between green, yellow and red lights. A powerful green traffic light is not confused with an oncoming vehicle. Since a single sensor with a color mosaic filter i.e. Bayer pattern mosaic is used, the lens is defocused so as to spread a light source over multiple pixels. The use of the color mosaic filter reduces both the effective image sensor resolution (by 50%) and the intensity response (to less than one third). The color mosaic filter may preclude the use of the same sensor for traffic sign recognition (TSR) or lane departure warning (LDW) because of the intensity response penalty.

Given that forward collision warning (FCW), traffic sign recognition (TSR) and lane departure warning (LDW) already require a high resolution monochrome sensor, a new automatic high-beam control (AHC) algorithm was developed for use with high resolution monochrome sensors as disclosed in U.S. Pat. No. 7,566,851. A number of different pattern recognition techniques are used with higher resolution monochrome imaging sensors to identify light sources instead of relying on color information. The automatic high-beam control (AHC) algorithm includes the following features: Detect bright spots in the sub-sampled long exposure image and then perform clustering and classification in the full resolution image, classify spots based on brightness, edge shape, internal texture, get further brightness information from the short exposure frames and classify obvious oncoming headlights based on size and brightness, track spots over time and compute change in size and brightness, pair up matching spots based on similarity of shape, brightness and motion, classify pairs as oncoming or taillights based on distance, brightness and color, and estimate distance and where unmatched spots might be motorcycles taillights.

U.S. patent application Ser. No. 12/573,836 describes "bundling" or parallel processing of multiple driver assistance systems (e.g. automatic high-beam control (AHC) and traffic sign recognition (TSR), lane departure warning (LDW), forward collision warning (FCW)) on a single hardware platform 16, e.g. camera 12 and processor 14. Bundling provides cost reduction and may allow more driver assistance functions to be added to the vehicle without increasing the space required beyond the windshield of the vehicle.

Different driver assistance applications have different requirements from camera 12, and associated optics. For example, a conventional automatic high-beam control (AHC) algorithm makes significant use of color information and thus requires a color sensor, while lane detection and traffic sign recognition require the extra sensitivity of a monochrome sensor for operation under low light conditions. No single gain/exposure setting is optimal for all applications and in fact, some applications (such as AHC and TSR) may each use more than one gain/exposure setting. Most driver assistance applications require processing over multiple windows of a single frame and/or multiple image frames. In some cases, image frames are partitioned between different driver assistance applications and in other cases the image frames are shared between the different driver assistance applications.

A vector processor, or array processor, is a processor that implements an instruction set containing instructions that operate on one-dimensional arrays of data called vectors. is in A scalar processor in comparison operate on a single datum. Most commonly used processors are scalar processors VLIW (Very Long Instruction Word) digital signal processing units. contain several sub-processing units which operate in parallel. The VLIW contains multiple opcodes which direct the various sub-processing units, thus allowing for parallel processing since each sub-unit gets its opcode at the same time. An op-code is a portion of a machine language instruction that specifies an operation to be performed.

Figure 3:
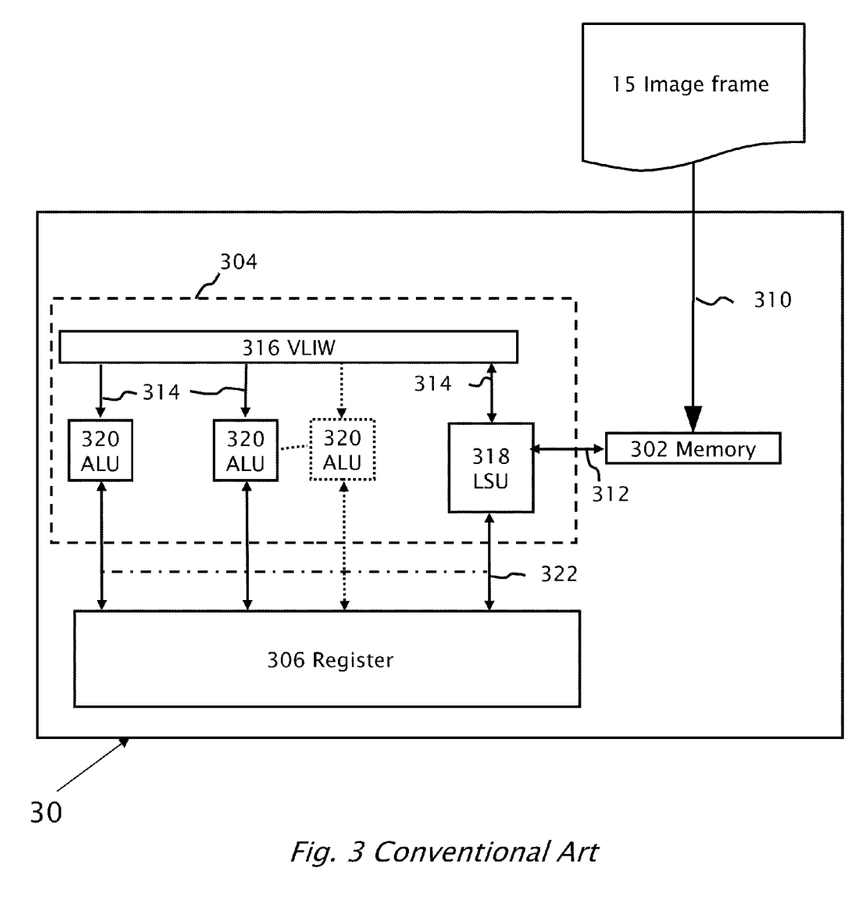
FIG. 3 shows a system block diagram of an image processing system according to conventional art.

Reference is now made to FIG. 3, a system block diagram for a conventional image processing system 30. Image processing system 30 has a processor 304 connected to a register 306 via a register bus 322. A memory 302 is connected to image sensor 12 (not shown in FIG. 3) for inputting one image frame 15 at a time via an image frame bus 310. Processor 304 has multiple arithmetic and logic units (ALU) 320 and a load store unit LSU 318 connected to a very long instruction word (VLIW) 316 via data bus 314. ALU 320 and a load store unit LSU 318 are connected to register 306 by register bus 322. LSU 318 connects to and accesses memory 302 via memory bus 312.

During operation of image processing system 30, multiple arithmetic and logic units ALU 320 operate in parallel via op-codes (operation codes) provided by VLIW 316. In the case of VLIW 316, many op-codes provide multiple commands which allow parallel processing by sub-processing units ALU 320. VLIW 316 contains address information to be used by one of ALU 320 to compute the upcoming address to be then used by LSU 318 in a subsequent cycle.

Load-storage unit (LSU 318) is responsible for accessing memory 302. The address for LSU 318 generally comes from register file 306 where the address is the result of a computation performed by the other sub-units. As a result, LSU 318 must wait until the necessary address is calculated. Furthermore, ALU 320 requires at least one cycle to performing the address calculation instead of performing an algorithm specific computation.

Thus there is a need for and it would be advantageous to have a hardware platform suitable to support multiple image frames and/or multiple windows for processing in parallel multiple driver assistance applications, and specifically an address generator which calculates addresses over multiple image frames and/or multiple windows to support processing of multiple driver assistance applications using a single hardware platform.

DEFINITIONS

The term "image sensor" as used herein refers to or includes a photosensitive surface. A typical "image sensor" is electronic with a finite number of picture elements or pixels which cover an area. The "picture elements" typically have a length and width in image space.

The term "image size parameter" in the context of the present invention refers to the size of an image either in image coordinates or as accessed in memory.

The term "image parameter" refers to one or more of the image frames as stored in memory and specifies which image frame(s) to process. The term "window" as used herein refers to a locus of pixels or a number of contiguous pixels in an image frame.

The terms "parameter", "address parameter" or "addressing parameter" are used herein interchangeably and refer to both said "image size parameter" and "image parameter".

BRIEF SUMMARY

According to an aspect of the present invention there is provided an image processing system including a vector processor and a memory adapted for attaching to the vector processor. The memory is adapted to store multiple image frames. The vector processor includes an address generator operatively attached to the memory to access the memory. The address generator is adapted for calculating addresses of the memory over the multiple image frames. The addresses may be calculated over the image frames based upon an image parameter. The image parameter may specify which of the image frames are processed simultaneously. A scalar processor may be attached to the vector processor. The scalar processor provides the image parameter(s) to the address generator for address calculation over the multiple image frames. An input register may be attached to the vector processor. The input register may be adapted to receive a very long instruction word (VLIW) instruction. The VLIW instruction may be configured to transfer only: (i) operation codes for image processing calculations over the image frames by the ALU units and (ii) a single bit to the address generator. The addresses are calculated over the multiple image frames based upon at most one image size parameter which specifies a dimension of the image frames or the addresses are calculated over the multiple image frames based upon at most two image size parameters which specify a dimension of the image frames.

According to an aspect of the present invention there is provided a method for processing images in a system including a vector processor and a memory. The vector processor includes an address generator attached to the memory to access the memory. The address generator is adapted for calculating addresses of the memory. The multiple image frames are stored in the memory. A VLIW instruction may be received for the parallel processing of data stored at the calculated addresses. The parallel processing may be performed by the vector processor according to the VLIW instruction. An image parameter may be loaded and read by the address generator. The loading of the image parameter may be performed externally to the VLIW instruction and the address generator receives only a single bit of the VLIW instruction to enable the calculation of addresses. The addresses of the memory may be calculated for the image frames based upon the image parameter; and the image frames are processed in parallel using the addresses. The image frames are typically stored contiguously in memory. The loading of the image parameter may be performed in a register attached to or resident in the address generator. The image parameter may specify at least two of the image frames to be processed in parallel. The calculation is based upon the image parameter including at most two image size parameters which specify the size of the image frames. The calculation may be based upon the image parameter including at most one image size parameter which specifies the size of the image frames.

According to an aspect of the present invention there is provided a method for processing images in a system including a vector processor and a memory. The vector processor includes an address generator operatively attached to the memory to access the memory. The address generator is adapted for calculating addresses of the memory. An image frame is stored in the memory. A window parameter is loaded and read which specifies multiple windows within the image frame. Addresses are calculated for the multiple windows within the image frame based upon the image parameter. Image data stored at the addresses are processed in parallel. A VLIW instruction may be received for the parallel processing of data stored at the calculated addresses. The parallel processing may performed by the vector processor according to the VLIW instruction. The loading of the window parameter is performed externally to the VLIW instruction. The address generator receives a single bit of the VLIW instruction to enable the calculation of addresses.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

The foregoing and or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention take advantage of the fact that image processing is being performed involving image patches of a given width and height located in a given memory. Having specific parameters known in advance of the computation-intensive image processing allows avoiding address calculations during actual image processing.

Using conventional circuitry 30 VLIW 316 contains address information to be used by ALU 320 to compute the upcoming address to be then used by the LSU 318 in a subsequent cycle. According to an aspect of the present invention addresses are calculated as needed, and thus VLIW bits used to pass the addressing information in conventional circuitry 30 are now available for other operand information, or simply a more compact instruction word (which thus saves on program memory used to store the instructions).

According to an aspect of the present invention, addressing parameters, e.g. width (w), height (h) in image space and origin or starting point in memory are provided and used to calculate memory addresses for multiple image frames and/or multiple windows thereby freeing up other computation subunits for actual image processing calculations, e.g. for driver control applications.

It should be noted that embodiments of the present invention are useful for many different image processing algorithms, particularly image processing calculations and/or algorithms (including but not limited by) sum of squared differences, sum of absolute differences, median filter, Hough transform, image intensity accumulation) which process every pixel within a given image windows.

Figure 4:
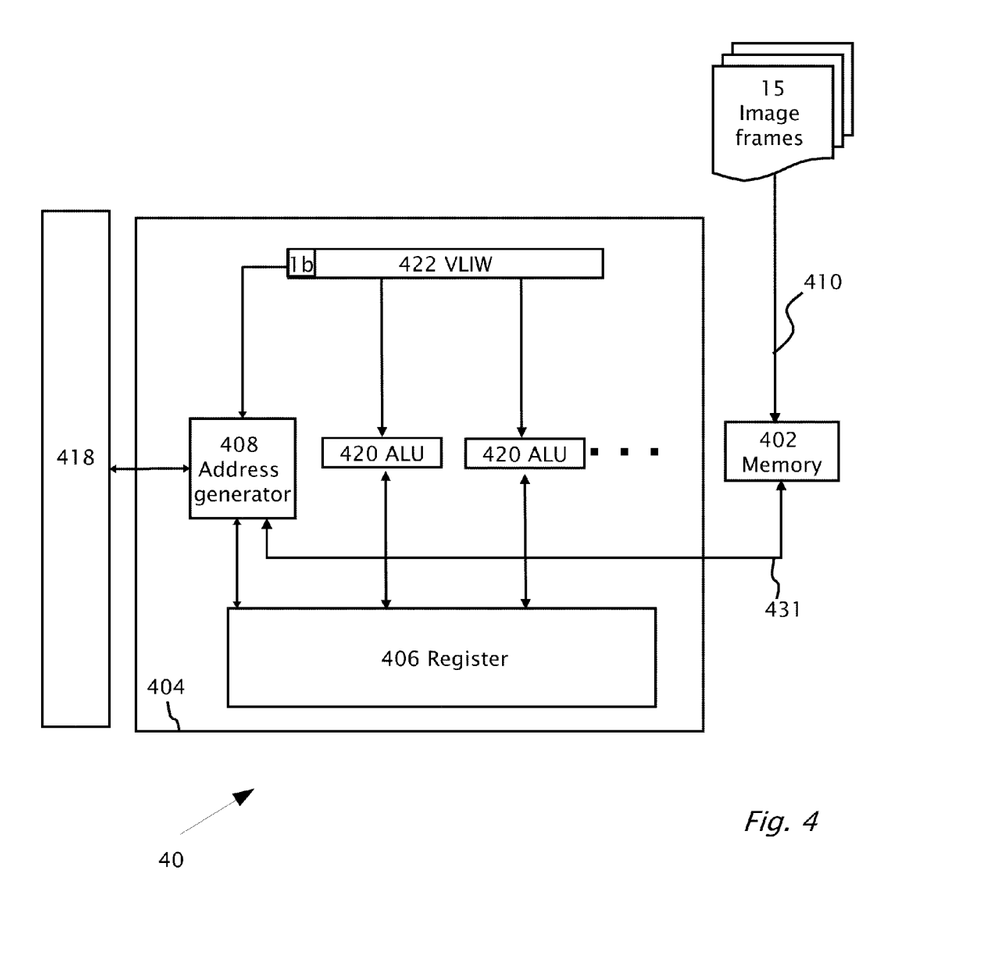
FIG. 4 shows a system block diagram of an image processing system and address generator connected according to an embodiment of the present invention.

Referring now to the drawings, FIG. 4 illustrates a system block diagram for an image processing system 40 according to an embodiment of the present invention. Image processing system 40 includes a vector processor 404, a memory 402 and a scalar processor 418. Memory 402 connects to an input of multiple image frames 15 via an image frame bus 410. Vector processor 404 includes multiple arithmetic logic units (ALU) 420 and an address generator 408 which connect to register 406 via their own separate buses (thus allowing simultaneous register file access. Address generator 408 connects to memory 402 with a memory bus 431. Arithmetic logic units (ALU) 420 and address generator 408 connect to a very long instruction word (VLIW) 422 via their own separate buses (thus allowing simultaneous execution of the relevant opcodes. A single bit 1b of VLIW 422 connects directly to address generator 408.

Figure 6A:
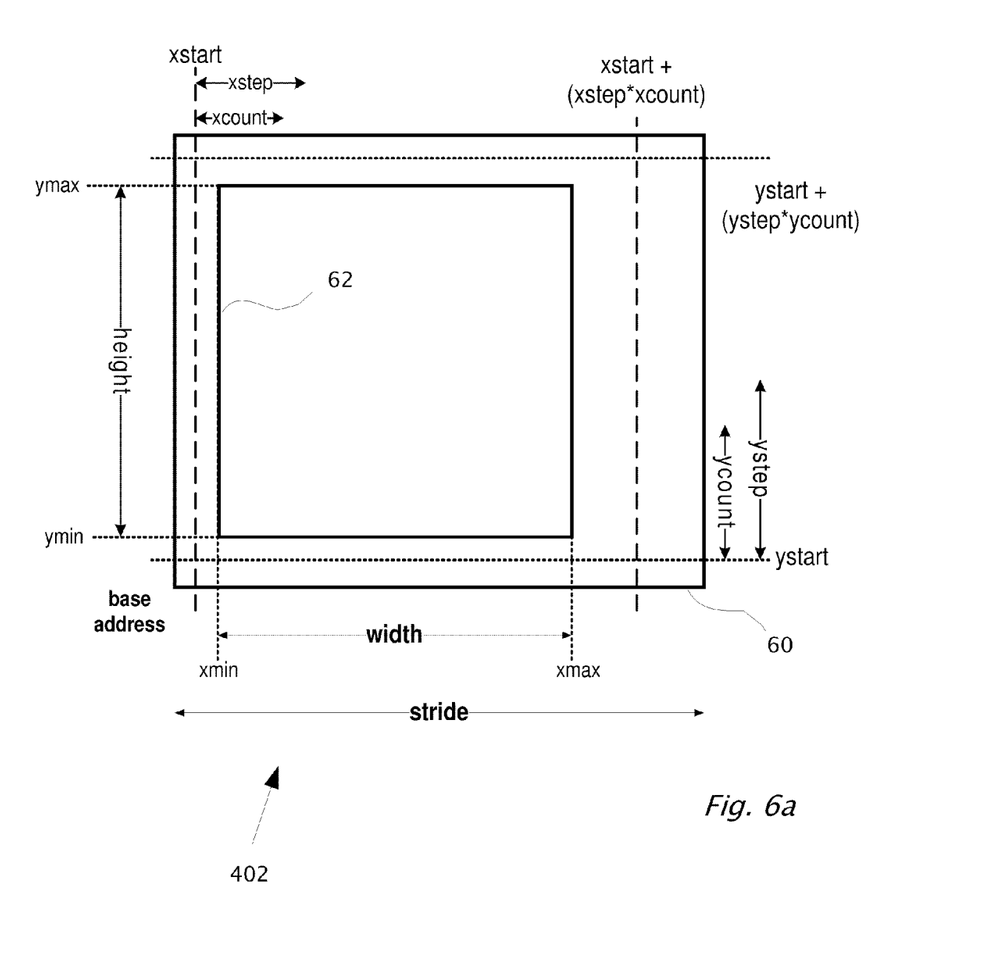
FIG. 6a shows schematically a diagram of an image frame with a window according to an embodiment of the present invention.

Reference is now made to FIG. 6a which shows schematically an image frame 60 in memory 402 with a window 62 according to different aspects of the present invention. The vertical and horizontal dimensions of window 62 are defined by ymax−ymin (height) and xmax−xmin (width) respectively. Window 62 defines an area of interest within image frame 62. Image frame 62 is typically larger than window 60. Image frame 60 has pixel values which are stored in a base address. Using the parameter width for example; width may be defined as a difference between window 62 and the larger image frame 62 (stride is greater than width). The difference is relative to the horizontal and vertical pixel co-ordinates of image frame 62 compared to window 60. The difference may be calculated each time window 60 is moved around inside image frame 62. Window 60 is traversed vertically and horizontally according to the values of ystep/, ystart/, ycount, and xstep/ xstart/ xcount respectively.

By way of example only, the following equation may be used by address generator 408 to iteratively map image coordinates X, Y of one or more image frames into memory addresses, according to the present embodiment:

$$\text{Next Address} = \text{Base} + X + Y * \text{Width} \qquad \text{Eq. 1}$$

X is a pixel number per row related to a horizontal coordinate in image coordinates of an image frame. Y is the number of rows related to a vertical coordinate in image coordinates of the image frame. X and Y may be equivalently defined in terms of the memory addresses storing the image frame with certain assumptions, for instance one byte per pixel intensity datum.) Width is the number of memory addresses storing a row in an image frame or the difference between the respective first addresses storing consecutive rows. Base is a pointer or memory address in memory 402 for the first memory address for one or more image frames in memory 402. The value of the Base pointer is a constant term added to all addresses generated through the iterations of X and Y. Multiple values of Base allow for generation of addresses for multiple image frames stored in memory 402.

Figure 5:
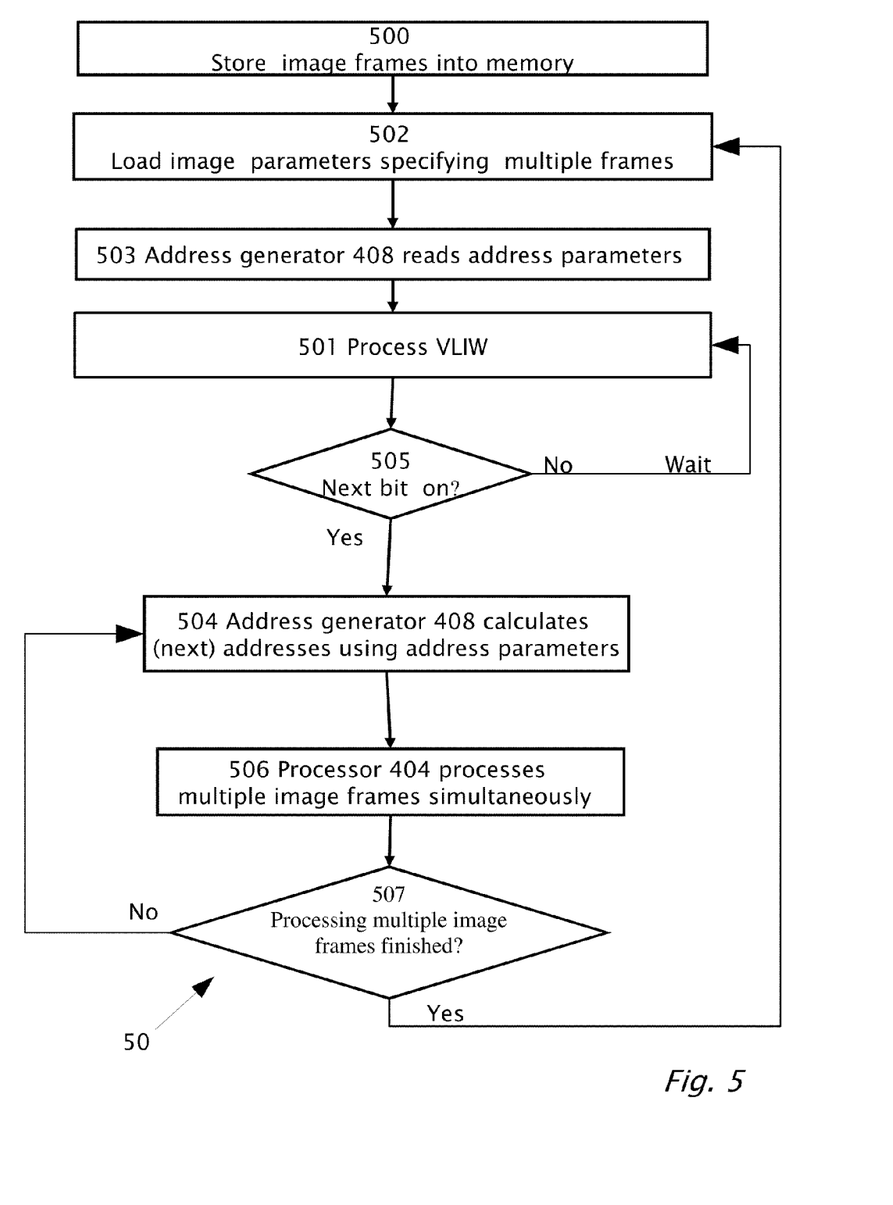
FIG. 5 shows a flow diagram of a method using an image processing system and address generator according to an embodiment of the present invention.

Reference is now also made to FIG. 5, which illustrates a flow diagram of a method 50 using image processing system 40 according to an exemplary embodiment of the present invention. Multiple image frames 15 are stored (operation 500) typically contiguously in memory 402 via image frame bus 410. At least two of stored multiple image frames 15 are to be processed simultaneously and/or in parallel. Address parameters are loaded (operation 502) by a load storage unit of scalar processor 418 in a dedicated register of address generator 408 or in register 406. Address generator 408 reads (operation 503) the address parameters. VLIW is processed (operation 501) One or more of the address parameters typically specifies the multiple image frames to be processed in parallel. If single bit labeled 1b in VLIW 422 of system 40 (FIG. 4) is on, (either "1" or "0") (decision block 505), then address generator 408 calculates (operation 504) addresses required by scalar processor 418 over the multiple image frames. Otherwise, in decision block 505, address generator 408 waits for bit 1b to turn on. Processor 404 performs image processing on the multiple image frames 15 simultaneously (operation 506) without frame-by-frame calculation of addresses because the required addresses for the multiple image frames have been previously calculated by address generator 408 for all the multiple frames to be processed (operation 506). Calculation (operation 504) of addresses may be performed while image frames 15 are being stored (operation 502) in memory. During processing (operation 506), bit 1b of VLIW is typically turned off. When processor 404 has completed processing the calculated addresses for only respective portions of all the image frames to be processed and the processing over entire image frames is not finished (decision block 507), then bit 1b of VLIW is typically turned on and process 50 feeds back to operation 504 during which address generator 408 calculates the next portions of addresses of the multiple image frames using the same image parameters already loaded in operation 502. When in decision box 507 processing of all the addresses of the multiple image frames is completed then process 50 may continue with loading (operation 502) new image parameters.

Figure 6B:
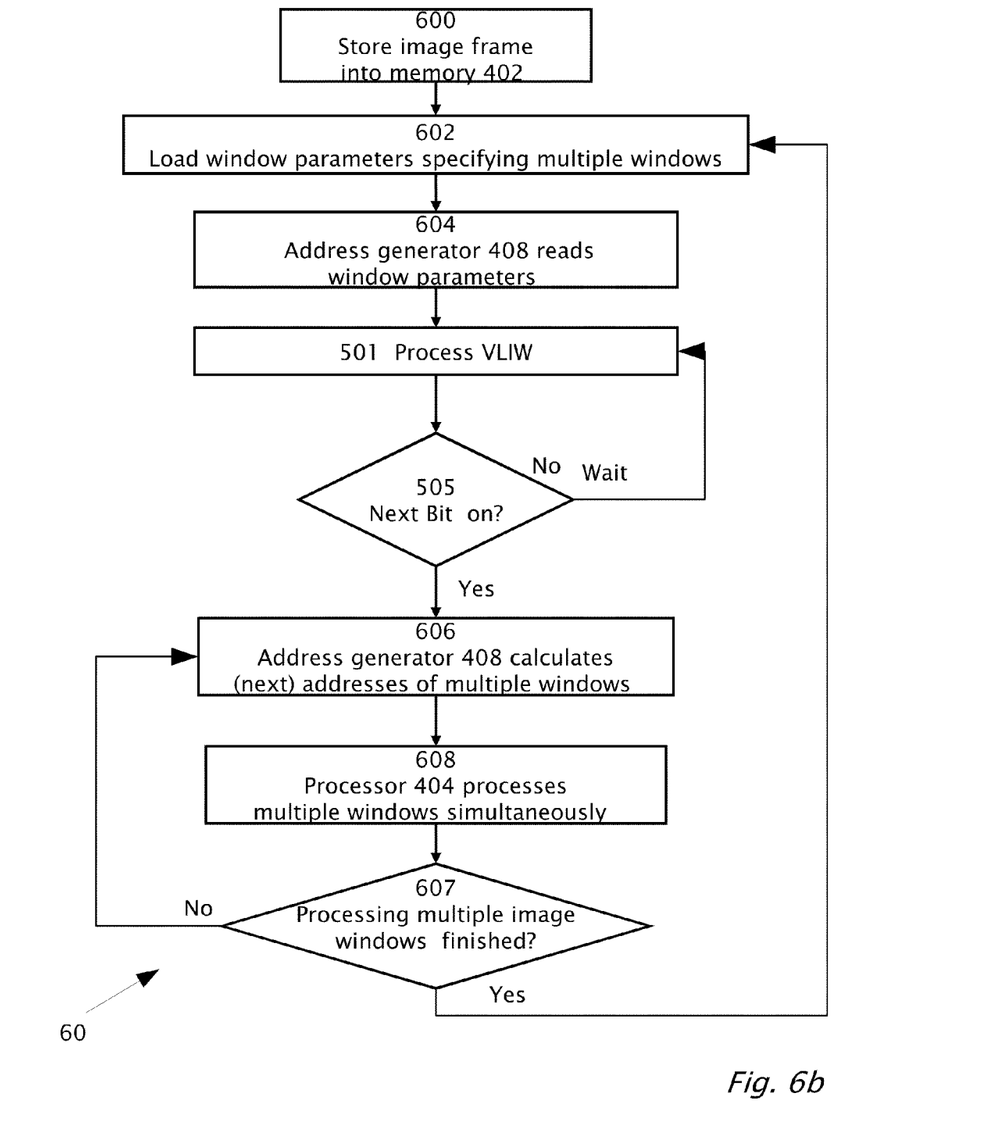
FIG. 6b illustrates a method using an image processing system, according to another embodiment of the present invention.

Reference is now also made to FIG. 6b which illustrates a flow chart of another method using image processing system 40, according to an exemplary embodiment of the present invention. An image frame 15 is stored (operation 600). Register 406 or a dedicated register in address generator 408 is loaded (operation 602) with window parameters specifying multiple windows by scalar processor 418. Address generator 408 reads (operation 604) the window parameters loaded in operation 602. VLIW is processed (operation 501).

During processing (operation 606), bit 1b of VLIW is typically turned off. When processor 404 has completed processing the calculated addresses for only respective portions of all the windows to be processed and the processing over entire windows is not finished (decision block 607), then bit 1b of VLIW is typically turned on and process 60 feeds back to operation 606 during which address generator 408 calculates the next portions of addresses of the multiple windows using the same image parameters already loaded in operation 602. When in decision box 607 processing of all the addresses in the multiple windows is completed then process 60 may continue with loading (operation 602) new image parameters.

Address generator 408 calculates (operation 606) the addresses of the multiple windows required by scalar processor 418. Vector processor 404 performs image processing on the multiple windows simultaneously (operation 608) without calculating addresses window-by-window because the addresses for multiple windows required have been previously calculated by address generator 408.

Figure 7:
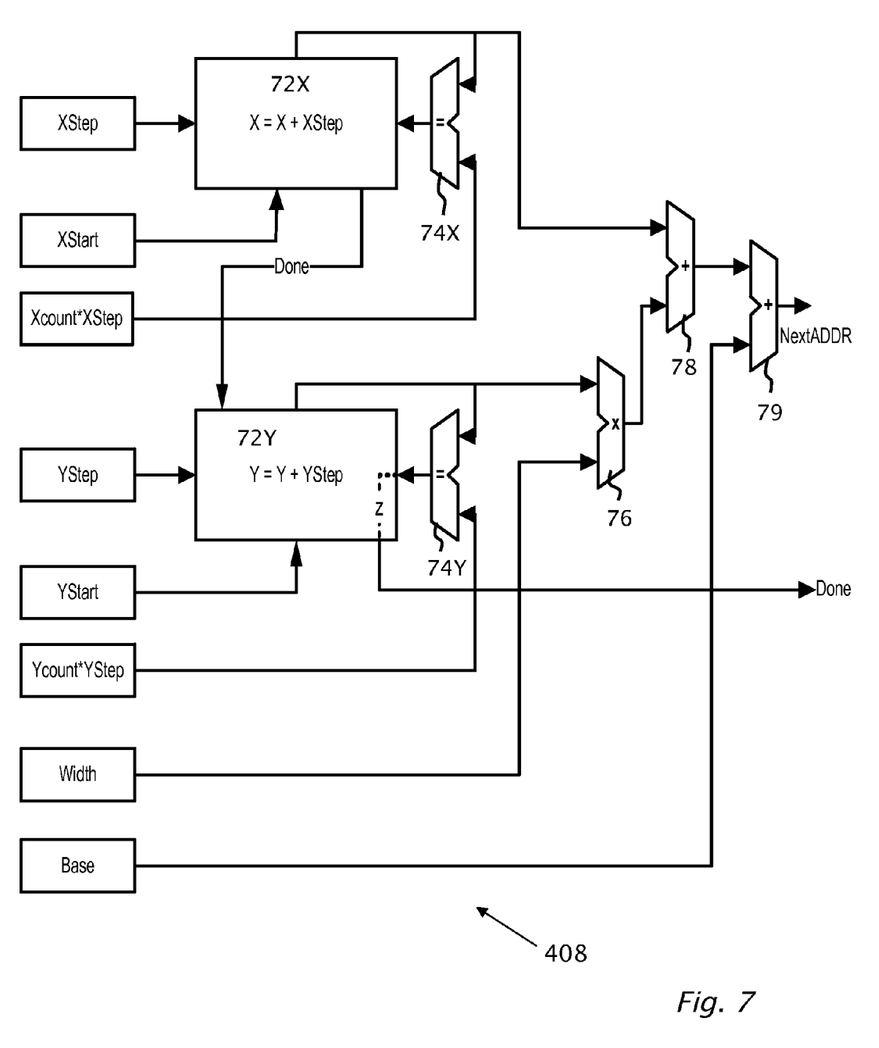
FIG. 7 illustrates a simplified block diagram of address generator according to embodiment of the present invention.

Reference is now made to FIG. 7 which illustrates a simplified block diagram of address generator 408 which calculates addresses according to Equation 1 above. A counter 72X is used to iterate in the horizontal direction in image coordinates, X=X+XStep. XStart is the first value of X, which is then incremented XCount times by the value of XStep. X is set to XStart each time a new X iteration is started. XStep is the value by which X is incremented at each X iteration, thus allowing accesses to skip over pixels. XCount is the number of iterations in the X image coordinate, i.e. X is incremented XCount times as determined by comparator 74X.

A counter 72Y is used to iterate in the vertical direction in image coordinates, Y=Y+YStep. YStart is the first value of Y, which is then incremented YCount times by the value of YStep. Y is set to YStart each time a new Y iteration is started. YStep is the value by which Y is incremented at each Y iteration, thus allowing accesses to skip over rows of pixels. YCount is the number of iterations in the Y image coordinate, i.e. Y is incremented YCount times as determined by comparator 74Y.

Multiplication of the number of memory addresses storing a row, Width, by the number of rows Y, is performed by multiplier 76. The product as output of multiplier 76 is added to X by an adder 78. The next address NextAddr calculated is found by adding the base address Base to the sum from adder 78 using adder 79.

For processing two or more image frames of the same size, equation 1 may still be used by having the Base value employ an image number $N_i$ multiplied by the memory size $S_m$.

$$Base_i = N_i * S_m \qquad \text{Eq. 2}$$

Thus, Base, is used to reach the start of every desired frame, which is then traversed according to equation 1.

Thus, the feature of the present invention for generating addresses over multiple image frames may be referred to herein as generating addresses over a third dimension or a z-dimension.

Pipeline Delay Register

Address generator unit 408 may be designed to provide addresses required by scalar processor 418 based on the image parameters loaded. For a given image, address generator 408 cycles through the x, y, z dimensions and an instruction sequence programmed for the specific coordinate is executed.

As an example the following operation is performed. For corresponding pixels in two distinct image frames, the intensity value of the pixels are subtracted and the result is stored.

This operation requires two loads, one subtract, and one store (four operations in total). The operations are executed in pipeline and parallel fashion such that it takes four cycles until the store is executed, subsequently, however, a new result is stored every cycle. In order to account for this pipeline delay, a register is provided optionally in register block 406 to indicate to address generator 408 not to execute the store until a delay has been met.

Non-Aligned Data Handling

Another salient feature of address generator 408 is the ability to efficiently handle non-aligned data. In a typical 8-bit pixel image processing system, pixel data is stored in memory that is not 8-bits wide, but rather has a bus width of 32 or 64 bits. (There are two reasons for using wide buses: (1) Very long instruction word (VLIW) digital signal processing units (DSP) handle multiple pairs of inputs in parallel, and thus the system should be capable of supplying multiple pixels (e.g., 8 pixels=64 bit memory accesses) to maintain the units in full operation. (2) Furthermore, by increasing the width of the system bus this correspondingly reduces the number of access cycles needed to DMA images into local memory.) Statistically, the desired image patch is not aligned to the system bus width. There are one or more "undesired" pixels in the memory word read before the first valid pixels in the first row. The same is true of the row end; the last valid memory word is read followed by a number of undesired pixels.

Thus, any processing should eliminate, ignore, or mask out the undesired pixels read in the first and last memory words of every row processed and should also insure that invalid data is not written back to memory. Address generator 408 includes or accesses two programmable registers which may be used to determine where the valid pixel boundaries are within the initial and final memory words of a given row.

For memory reads, address generator 408 may zero out the invalid data bits which allows the ALUs 420 to process the entire memory word without any influence to the calculation results. (In general, zero data does not influence algorithms involving addition and multiplication, except in special cases for which software would then have to take this into account). For memory writes, the address generator 408 may disable the Byte Enable lines corresponding to the invalid bytes.

Flow Control

In a standard processor there is a program counter which points to the next instruction to execute; usually the next memory location in program memory, unless there is a programmed branch instruction which then forces the program counter to the program memory location pointed to by the branch instruction. The processor loads the new address from the BRA instruction. Furthermore, the processor determines if the loop has completed. Hence conventional flow control requires computing resources and clock cycles.

In contrast, system 40 optionally includes hardware to support looping code thereby eliminating overhead associated with supporting loops. The system contains registers (for instance in register block 406) which point to the beginning of a loop and the end of the loop such that once the loop has been entered it will continuously execute autonomously forever (i.e., going from beginning to end and back to the beginning without intervention). In order to break the "infinite loop" the circuitry accepts an external "break" signal generated from address generator 408 which has been pre-programmed with the parameters of the loop (e.g., x, y max). In this way, processor resources are not wasted on handling the loop flow control.

The definite articles "a", "an" are used herein, such as "an image parameter", "an address generator", "a register", "a processor" have the meaning of "one or more" that is "one or more image parameters", "one or more address generators" "one or more registers" or "one or more processors".

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined.

Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. An image processing system comprising:
a vector processor (404); and
a memory (402) adapted for operatively attaching to said vector processor (404), wherein said memory (402) is adapted to store a plurality of image frames (15),
wherein said vector processor (404) includes an address generator (408) operatively attached to said memory (402) to access said memory (402),
wherein said address generator (408) is adapted for calculating addresses of said memory (402) over said image frames (15),
wherein said address generator (408) is programmed with parameters of an execution loop over the image frames (15),
wherein said parameters are selected from a group of horizontal (X) and vertical (Y) image parameters, the group consisting: a horizontal increment value (Xstep), an initial horizontal value (XStart), a horizontal product of the horizontal increment value (Xstep) and a horizontal count iteration value (Xcount), a vertical increment value (YStep), an initial vertical value (Ystart), a vertical product of said vertical increment value (Ystep) and a vertical count iteration value (Ycount), a number of memory addresses (Width) and a memory size value of said memory (402) per image frame (Base);
wherein said address generator (408) includes:
a horizontal counter (72X) with a horizontal output of X=X+Xstep, wherein the a horizontal counter 72X has inputs from the horizontal increment value (Xstep) and the horizontal value (XStart);
an output of a comparator (74X) connected to another input of the horizontal counter (72X), wherein the comparator (74X) compares the horizontal output of X=X+Xstep with the horizontal product of the horizontal increment value (Xstep) and the horizontal count iteration value (Xcount);
a vertical counter (72Y) with a vertical output of Y=Y+Ystep, wherein the vertical counter 72Y has inputs from the vertical increment value (Ystep), the vertical value (YStart) and a signal (DONE) from the horizontal counter (72X);
an output of a comparator (74Y) connected to another input of the vertical counter (72Y), wherein the comparator (74Y) compares the vertical output of Y=Y+Ystep with the vertical product of the vertical increment value (Ystep) and the vertical count iteration value (Ycount);
a multiplier (76), wherein a multiplier output of the a multiplier (76) is the vertical output of Y=Y+Ystep multiplied with the number of memory addresses (Width);
an adder (78), wherein a first adder output of the adder (78) is the multiplier output added with the horizontal output of X=X+Xstep;
a second adder (79), wherein a second adder output (NextADDR) of the second adder (79) is the first adder output added with memory size value of said memory (402) per image frame (Base);
wherein said vector processor (404) includes hardware to support looping code during execution, and
wherein said address generator (408) is configured to generate a break signal to be received by said hardware to break execution of said looping code of the vector processor (404) over the image frames (15), wherein said break signal is a second output (DONE) of said vertical counter (72Y).

2. The image processing system according to claim 1, wherein said addresses are calculated over said image frames (15) based upon an image parameter.

3. The image processing system according to claim 2, wherein said image parameter specifies which of the image frames (15) are processed simultaneously, wherein said image frames (15) are processed in parallel for multiple driver assistance applications using a single hardware platform.

4. The image processing system according to claim 3, further comprising a scalar processor (418) operatively attached to said vector processor (404), wherein said scalar processor (418) provides said image parameter to said address generator (408) for said calculating over said image frames (15).

5. The image processing system according to claim 1, further comprising an input register (406) operatively attached to said vector processor (404), wherein said input register (406) is adapted to receive a very long instruction word (VLIW) instruction (422), wherein only one bit of said VLIW instruction (422) is provided to said address generator (408).

6. The image processing system according to claim 1, wherein said vector processor (404) includes:
at least one arithmetic and logic unit (ALU) (420); and
an input register (406) adapted for receiving a very long instruction word (VLIW) instruction (422), wherein said VLIW instruction (422) is configured to transfer only: (i) operation codes for image processing calculations over said image frames (15) by said at least one ALU unit (420) and (ii) a single bit to said address generator (408).

7. The image processing system according to claim 1, wherein said addresses are calculated over said multiple image frames (15) based upon at most one image size parameter which specifies a dimension of said image frames (15).

8. The image processing system according to claim 1, wherein said addresses are calculated over said multiple image frames (15) based upon at most two image size parameters which specify a dimension of said image frames (15).

9. A method of processing images in a system including a vector processor (404) and a memory (402), wherein the vector processor (404) includes an address generator (408) operatively attached to the memory (402) to access the memory (402), wherein said address generator (408) is adapted for calculating addresses of said memory (402), wherein said vector processor (404) includes hardware to support looping code during execution, the method comprising:
storing a plurality of image frames (15) in the memory (402);
accessing the memory (402) by the address generator (408);
loading an image parameter, wherein said image parameter is selected from a group of horizontal (X) and vertical (Y) image parameters, the group consisting of: a horizontal increment value (Xstep), an initial horizontal value (XStart), a horizontal product of the horizontal increment value (Xstep) and a horizontal count iteration value (Xcount), a vertical increment value (YStep), an initial vertical value (Ystart), a vertical product of said vertical increment value (Ystep) and a vertical count iteration value (Ycount), a number of memory addresses (Width) and a memory size value of said memory (402) per image frame (Base);
calculating addresses for said image frames (15) based upon said image parameter, wherein said calculating further comprises the steps:

counting with a horizontal counter (72X), wherein the horizontal counter (72X) includes a horizontal output of X=X+Xstep, wherein the horizontal counter (72X) has inputs from the horizontal increment value (Xstep) and the horizontal value XStart;

connecting an output of a comparator (74X) to another input of the horizontal counter (72X), wherein the comparator (74X) compares the horizontal output of X=X+Xstep with the horizontal roduct of the horizontal increment value (Xstep) and the horizontal count iteration value (Xcount);

counting with a vertical counter (72Y), wherein the vertical counter (72Y) includes a vertical output of Y=Y+Ystep, wherein the vertical counter (72Y) has inputs from the vertical increment value (Ystep), the vertical value (YStart) and a signal (DONE) from the horizontal counter (72X);

connecting an output of a comparator (74Y) to another input of the vertical counter (72Y) wherein the comparator (74Y) compares the vertical output of Y=Y+Ystep with the vertical product of the vertical increment value (Ystep) and the vertical count iteration value (Ycount);

multiplying with a multiplier (76), wherein a multiplier output of the a multiplier (76) is the vertical output of Y=Y+Ystep multiplied with the number of memory addresses (Width);

adding with an adder (78), wherein a first adder output of the adder (78) is the multiplier output added with the horizontal output of X=X+Xstep;

adding with a second adder (79), wherein a second adder output (NextADDR) of the second adder (79) is the first adder output added with memory size value of said memory (402) per image frame (Base); and processing in parallel image data stored in said image frames (15), based on said programming, said address generator (408) generating a break signal;

receiving by the hardware said break signal, thereby breaking execution of said looping code of the vector processor (404) over the image frames (15).

10. The method according to claim 9, wherein said loading is performed in a register operatively attached to the address generator (408).

11. The method according to claim 9, further comprising receiving a VLIW instruction (422) for said processing in parallel.

12. The method according to claim 11, wherein said processing in parallel is performed by the vector processor (404) according to said VLIW instruction (422), wherein said loading of said image parameter is performed externally to said VLIW instruction (422).

13. The method according to claim 12, further comprising receiving by said address generator (408) only a single bit of said VLIW instruction (422) to enable said calculating addresses.

14. The method according to claim 9, wherein said image parameter specifies at least two of said image frames (15) to be processed in parallel.

15. The method according to claim 9, wherein said calculating is based upon said image parameter including at most two image size parameters which specify the size of said image frames (15).

16. The method according to claim 9, wherein said calculating is based upon said image parameter including at most one image size parameter which specifics the size of said image frames (15).

17. A method of processing images in a system including a vector processor (404) and a memory (402), wherein the vector processor (404) includes an address generator (408) operatively attached to the memory (402) to access the memory (402), wherein said address generator (408) is adapted for calculating addresses of said memory (402), and wherein said vector processor (404) includes hardware to support looping code during execution, the method comprising:

storing an image frame in the memory (402);

loading and reading a window parameter which specifies multiple windows within said image frame, wherein said window parameter is selected from a group of horizontal (X) and vertical (Y) image parameters, the group consisting: a horizontal increment value (Xstep), an initial horizontal value (XStart), a horizontal product of the horizontal increment value (Xstep) and a horizontal count iteration value (Xcount), a vertical increment value (YStep), an initial vertical value (Ystart), a vertical product of said vertical increment value (Ystep) and a vertical count iteration value (Ycount), a number of memory addresses (Width) and a memory size value of said memory (402) per image frame (Base);

calculating addresses for said multiple windows within said image frame based upon said image parameter, wherein said calculating comprises:

counting with a horizontal counter (72X), wherein the horizontal counter (72X) includes a horizontal output of X=X+Xstep, wherein the horizontal counter (72X) has inputs from the horizontal increment value (Xstep) and the horizontal value (XStart);

connecting an output of a comparator (74X) to another input of the horizontal counter (72X), wherein the comparator (74X) compares the horizontal output of X=X+Xstep with the horizontal roduct of the horizontal increment value (Xstep) and the horizontal count iteration value (Xcount);

counting with a vertical counter (72Y), wherein the vertical counter (72Y) includes a vertical output of Y=Y+Ystep, wherein the vertical counter (72Y) has inputs from the vertical increment value (Ystep), the vertical value (YStart) and a signal (DONE) from the horizontal counter (72X);

connecting an output of a comparator (74Y) to another input of the vertical counter (72Y), wherein the comparator (74Y) compares the vertical output of Y=Y+Ystep with the vertical product of the vertical increment value (Ystep) and the vertical count iteration value (Ycount);

multiplying with a multiplier (76), wherein a multiplier output of the a multiplier (76) is the vertical output of Y=Y+Ystep multiplied with the number of memory addresses (Width);

adding with an adder (78), wherein a first adder output of the adder (78) is the multiplier output added with the horizontal output of X=X+Xstep;

adding with a second adder (79), wherein a second adder output (NextADDR) of the second adder (79) is the first adder output added with memory size value of said memory (402) per image frame (Base); and processing in parallel image data of said multiple windows stored at said addresses, based on said programming, said address generator (408) generating a break signal;

receiving by the hardware said break signal, thereby breaking execution of said looping code of the vector processor (404) over the image frame.

18. The method according to claim 17, further comprising receiving a VLIW instruction (422) for said processing in parallel.

19. The method according to claim 18, wherein said processing in parallel is performed by the vector processor (404) according to said VLIW instruction (422), wherein said loading said window parameter is performed externally to said VLIW instruction (422).

20. The method according to claim 17, further comprising receiving by said address generator (408) only a single bit of said VLIW instruction (422) to enable said calculating.

* * * * *